United States Patent [19]
Ellis et al.

[11] Patent Number: 5,910,052
[45] Date of Patent: Jun. 8, 1999

[54] PROCESS FOR MANUFACTURING A CAPTIVE SCREW

[75] Inventors: Thomas J. Ellis, Wilmington, Del.; Edward A. McCormack, Chadds Ford; Harry L. Dickerson, Downingtown, both of Pa.

[73] Assignee: Southco, Inc., Concordville, Pa.

[21] Appl. No.: 09/059,735

[22] Filed: Apr. 14, 1998

[51] Int. Cl.[6] .................................................. B21G 5/00
[52] U.S. Cl. .................................. 470/6; 470/2; 72/348; 72/334
[58] Field of Search .............................. 72/347, 348, 352, 72/356, 379.4, 334; 470/2–7, 41; 11/41

[56] References Cited

U.S. PATENT DOCUMENTS

| | | | |
|---|---|---|---|
| 283,591 | 4/1986 | Swanstrom | D8/387 |
| D. 357,176 | 4/1995 | Ernest et al. | D8/387 |
| D. 388,316 | 12/1997 | McDonough et al. | D8/387 |
| 436,523 | 9/1890 | Glover | 470/6 |
| 748,078 | 12/1903 | Kaisling . | |

(List continued on next page.)

FOREIGN PATENT DOCUMENTS

| | | |
|---|---|---|
| 558456 | 6/1958 | Canada . |
| 1339942 | 11/1962 | France . |
| 2 268977 | 4/1975 | France . |
| 2 578009 | 2/1986 | France . |
| 2 636384 | 9/1988 | France . |
| 626013 | 9/1949 | United Kingdom . |
| 825877 | 12/1959 | United Kingdom . |
| 1579730 | 11/1980 | United Kingdom . |

OTHER PUBLICATIONS

Southco, Inc., Southco Latches and Access Hardware Handbook 45 NA, C1–C44, Pennsylvania, 1995.

Penn Engineering & Manufacturing Corp., Fasteners For Use In Or With PC Boards:, Pem Bulletin K–488, (Danboro, PA) 1980.

Camloc Fasteners, "Captive Screws", Catalog No. 3800, pp. 1–12 (Hasbrouck Heights, NJ).

Southco Fasteners Handbook 43, pp. C1–C11, C18–C27, (Pennsylvania) 1993.

American Society For Metals, Source Book on Cold Forming, pp. 83–87 (Ohio, 44073).

Huck International, Inc., "Captive Fasteners and Rivetless Nut Plates", (California, 90712) 1996.

Penn Engineering & Manufacturing Corp., Snap–Top Standoffs:, Pem Bulletin SSA–988, (Danboro, PA) 1987.

Penn Engineering & Manufacturing corp., "Type PF11 Self–Clinching Panel Fastener Assembly", Pem Bulletin PF11–297, (Danboro, PA) 1997.

*Primary Examiner*—Joseph J. Hall, III
*Assistant Examiner*—Ed Tolan
*Attorney, Agent, or Firm*—Paul & Paul

[57] ABSTRACT

A method of making a knob and ferrule for a captive screw is disclosed, the knob integrally attached to the screw, the ferrule attachable to a panel. The method of making the knob includes providing an aluminum alloy base metal for the knob, pressing by cold-forming the base material into a generally cylindrical cup-shaped article using at least one pressing operation, the cup having a generally cylindrical side wall, removing any base material situated outside the perimeter of the cup-shaped cylindrical article, and providing a hole in the bottom of the cup, coaxial with the hollow cylindrical walls of the cup, thereby forming the knob. The method of making the ferrule includes providing a metal base material for the ferrule, pressing the base material, by cold-forming, into a cylindrical article using at least one pressing operation, the cylindrical article having a cylindrical side wall having an outer surface, cold-forming an attachment device an end of the ferrule; and removing any base material situated outside the perimeter of the cylindrical article, thereby forming the ferrule. All major parts of the captive screw, including the knob, ferrule and screw may be cold formed.

12 Claims, 9 Drawing Sheets

U.S. PATENT DOCUMENTS

| | | | |
|---|---|---|---|
| 1,166,345 | 12/1915 | Gates . | |
| 1,188,420 | 6/1916 | Eadie . | |
| 1,664,820 | 4/1928 | Hughes . | |
| 2,006,359 | 7/1935 | Lackner | 151/39 |
| 2,151,255 | 3/1939 | Witchger | 85/32 |
| 2,331,322 | 10/1943 | Heinick | 85/32 |
| 2,470,927 | 5/1949 | Hale, Jr. | 151/21 |
| 2,553,236 | 5/1951 | Bratfisch | 85/40 |
| 2,773,574 | 12/1956 | Able | 192/43.1 |
| 2,831,520 | 4/1958 | Clarke | 151/69 |
| 2,967,557 | 1/1961 | Tait et al. | 151/69 |
| 2,987,811 | 6/1961 | Acres | 29/437 |
| 3,033,260 | 5/1962 | Snow | 151/41.7 |
| 3,052,942 | 9/1962 | Mulvaney | 24/224 |
| 3,056,197 | 10/1962 | Lawson | 72/356 |
| 3,059,736 | 10/1962 | Boyd | 189/36 |
| 3,126,935 | 3/1964 | Tuozzo | 151/69 |
| 3,137,336 | 6/1964 | Wing | 151/41.73 |
| 3,170,235 | 2/1965 | Williams | 72/356 |
| 3,180,389 | 4/1965 | Frank | 151/69 |
| 3,195,600 | 7/1965 | Middleton, Jr. | 151/69 |
| 3,204,680 | 9/1965 | Barry | 151/69 |
| 3,209,807 | 10/1965 | Ryner | 151/69 |
| 3,244,212 | 4/1966 | Barry | 151/69 |
| 3,245,450 | 4/1966 | Sauter | 151/69 |
| 3,250,559 | 5/1966 | Sommerfeld | 292/251 |
| 3,263,728 | 8/1966 | Lynch | 151/69 |
| 3,279,302 | 10/1966 | Modrey | 85/70 |
| 3,343,581 | 9/1967 | Martin et al. | 151/69 |
| 3,346,032 | 10/1967 | Gulistan | 151/69 |
| 3,385,341 | 5/1968 | Garstkiewicz | 151/39 |
| 3,437,119 | 4/1969 | Dey | 151/69 |
| 3,465,803 | 9/1969 | Earnest et al. | 151/69 |
| 3,564,563 | 2/1971 | Trotter et al. | 24/221 |
| 3,571,904 | 3/1971 | Gulistan | 29/443 |
| 3,718,950 | 3/1973 | Engstrom | 24/217 |
| 3,912,411 | 10/1975 | Moffat | 403/259 |
| 3,958,308 | 5/1976 | Gooding | 24/221 |
| 4,007,516 | 2/1977 | Coules | 24/221 |
| 4,047,266 | 9/1977 | Bisbing | 24/221 |
| 4,078,414 | 3/1978 | Orain | 72/354 |
| 4,367,643 | 1/1983 | Hackett | 72/353 |
| 4,387,497 | 6/1983 | Gulistan | 29/511 |
| 4,398,322 | 8/1983 | Ewen | 24/201 |
| 4,399,682 | 8/1983 | Hackett | 72/359 |
| 4,407,428 | 10/1983 | Stone | 72/348 |
| 4,525,326 | 6/1985 | Schwellinger | 420/535 |
| 4,594,040 | 6/1986 | Molina | 470/41 |
| 4,602,903 | 7/1986 | Wilburn | 411/222 |
| 4,692,075 | 9/1987 | Metz | 411/7 |
| 4,915,557 | 4/1990 | Stafford | 411/107 |
| 4,952,107 | 8/1990 | Dupree | 411/103 |
| 4,964,773 | 10/1990 | Schmidt | 411/373 |
| 4,975,007 | 12/1990 | Molina | 411/107 |
| 5,042,880 | 8/1991 | Garuti et al. | 301/9 DN |
| 5,094,579 | 3/1992 | Johnson | 411/107 |
| 5,146,668 | 9/1992 | Gulistan | 72/356 |
| 5,209,018 | 5/1993 | Heinrich | 49/449 |
| 5,336,028 | 8/1994 | Yamamoto | 411/107 |
| 5,338,139 | 8/1994 | Swanstrom | 411/353 |
| 5,382,124 | 1/1995 | Frattarola | 411/352 |
| 5,544,992 | 8/1996 | Ciobanu et al. | 411/353 |
| 5,642,972 | 7/1997 | Ellis et al. | 411/353 |

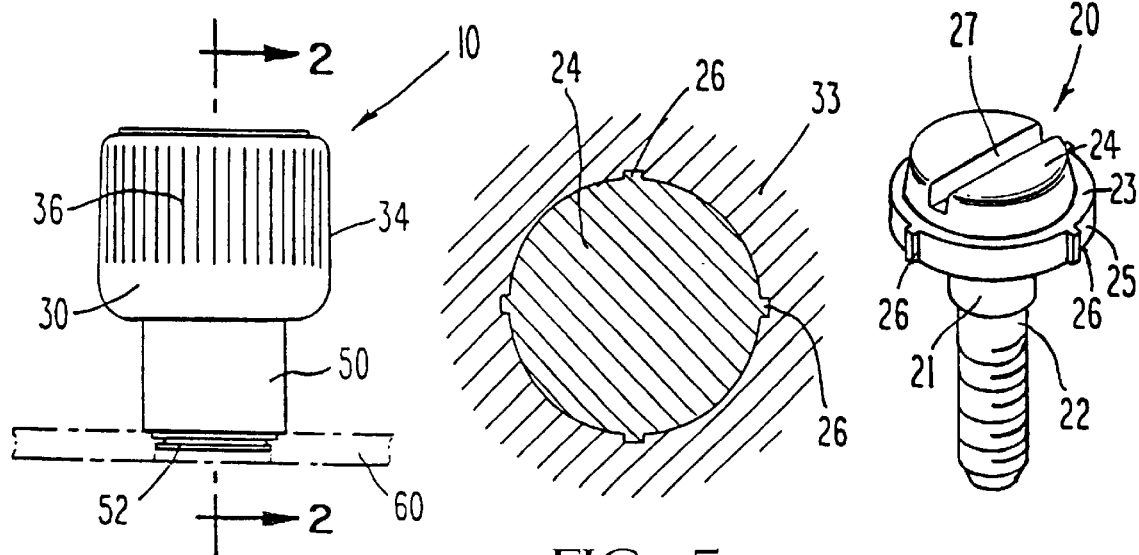
FIG. 5
FIG. 4
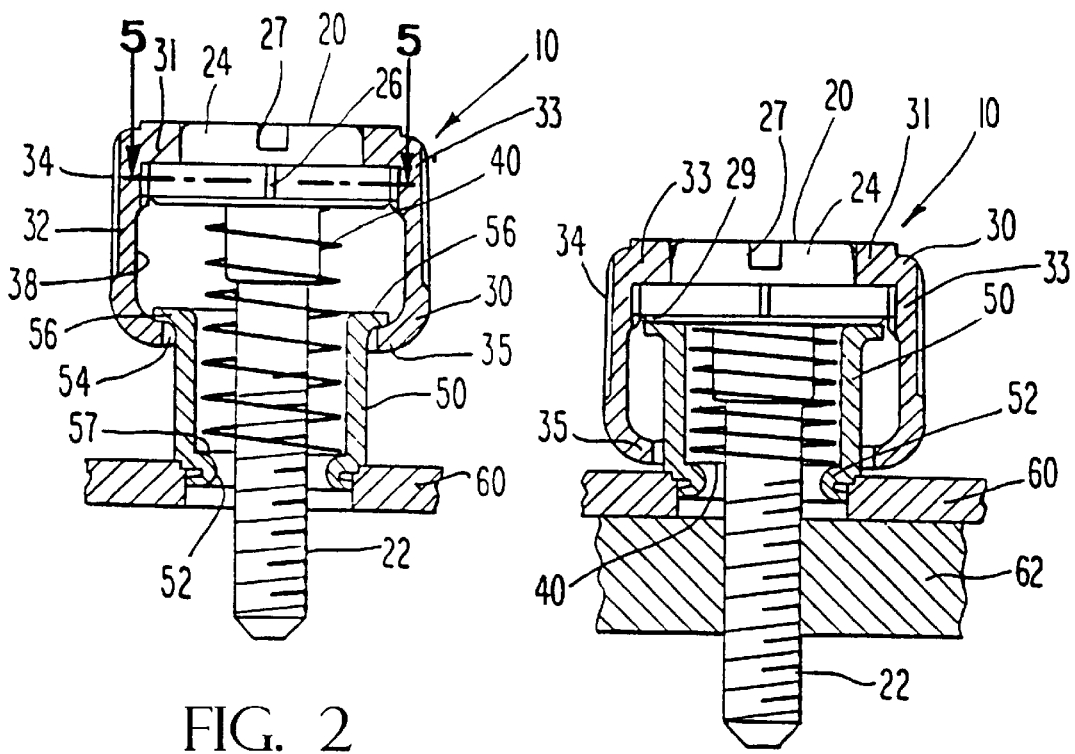
FIG. 2
FIG. 3

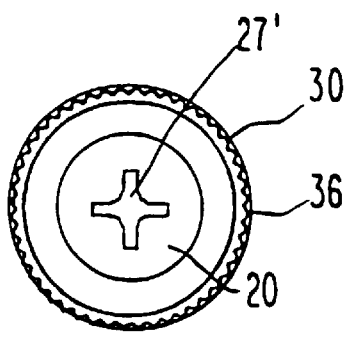 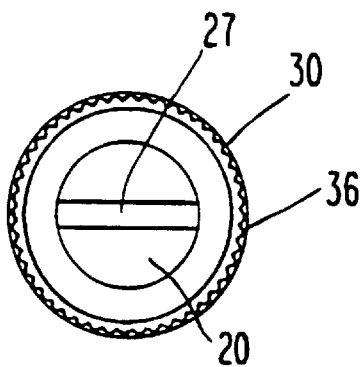 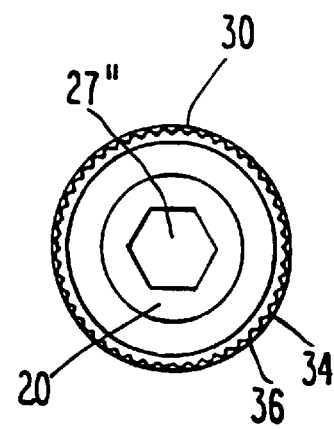
FIG. 6a     FIG. 6b     FIG. 6c
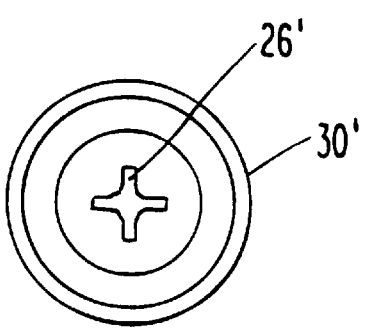 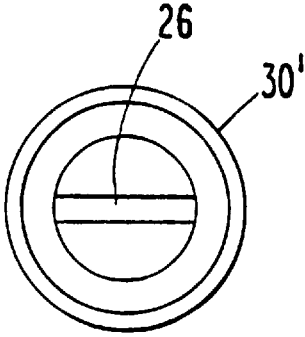 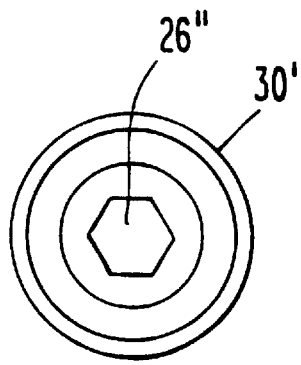
FIG. 7a     FIG. 7b     FIG. 7c

PROCESS FOR MANUFACTURING A CAPTIVE SCREW

BACKGROUND OF THE INVENTION

This invention relates to captive screws of the type generally used to attach a first panel to a second panel, frame or other surface wherein it is desired to keep the fastener in position on the first panel without loose items of hardware. The captive screw is mounted to the first panel such that the screw stays attached to the panel even when the threads of the screw are fully disengaged from a threaded hole in the second panel to which the first panel is attached.

The present invention is directed toward a new and improved process for manufacturing such a captive screw of a type which has a knob, a screw, and a ferrule. The captive screw is captivated on a panel by the ferrule and, as the screw is screwed into a second panel, the knob telescopically retracts over the ferrule. A spring may be used which urges the knob and integral screw to its fully retracted position when the captive screw is not attached to the second panel, thereby withdrawing the threads of the screw from the area of the lower panel.

The present invention is directed to a process for manufacturing such a captive screw wherein the three major components of the captive screw; the knob, the ferrule, and the screw may each be manufactured by cold forming.

In a typical cold forming process, a slug or billet is deposited within a solid die having a shape and a size corresponding to the desired article to be formed. Force is then longitudinally applied to the slug to cause the metal to flow and conform its shape to that of the die cavity. The article is then removed from the die cavity by pushing it axially out of the die cavity. A series of several dies may be used to incrementally move the material to the final desired shape.

Certain aluminum alloys as well as certain stainless steel alloys are conducive to cold forming. In the present invention, the knob is preferably made from an aluminum alloy, the ferrule is made from an aluminum alloy or carbon or stainless steel, depending on the panel fastening means used with the screw, and the screw itself is made from stainless steel.

When manufacturing in quantities, cold forming of components can offer substantial advantages over other forms of manufacturing items of metal such as machining. While the initial costs associated with setting up a cold forming manufacturing process can be high, including considerable expenses related to engineering and design obstacles, immense time savings with substantial cost savings can be achieved when sufficiently high quantities of captives screws are required. Due to difficulties in cold-forming all of the major components of this type of retractable captive screw, cold forming of the knob and ferrule of the captive screw has not heretofore been achieved. The present invention is for a process that overcomes these difficulties.

SUMMARY OF THE INVENTION

This invention relates to a process for manufacturing a low profile, retractable captive screw of the type wherein a first panel or other thin flat surface is to be mounted against another surface, such as a second panel or frame.

The process for manufacturing a captive screw of the present invention includes making a knob and ferrule for a captive screw, the knob integrally attached to the screw, said ferrule having means for attachment of the ferrule to a panel. The method of making the knob includes providing an aluminum alloy base metal for the knob, pressing by cold-forming the base material into a generally cylindrical cup-shaped article using at least one pressing operation, the cup having a generally cylindrical side wall, removing any base material situated outside the perimeter of the cup-shaped cylindrical article, and providing a hole in the bottom of the cup, coaxial with the hollow cylindrical walls of the cup, thereby forming the knob. The method of making the ferrule includes providing a metal base material for the ferrule, pressing the base material, by cold-forming, into a cylindrical article using at least one pressing operation, the cylindrical article having a cylindrical side wall having an outer surface, and cold-forming a panel captivation means on an end of the ferrule; and removing any base material situated outside the perimeter of the cylindrical article, thereby forming the ferrule.

It is therefore an object of the present invention to provide a process for manufacturing a captive screw that provides for an improved, captive screw that is amenable to cold forming.

It is a further object of the present invention to provide a process for manufacturing a captive screw that may be accomplished at a low unit cost in high quantities.

It is a further object of the present invention to provide a process for manufacturing a captive screw that utilizes reduced component manufacture time.

It is a further object of the present invention to provide a process for manufacturing a captive screw that utilizes reduced assembly time.

It is a further object of the present invention to provide a process for manufacturing a captive screw that may be produced with reduced unit raw material usage.

It is a still further object of the present invention to provide a process for manufacturing a captive screw that may be produced with accelerated throughput.

It is a still further object of the present invention to provide a process for manufacturing a captive screw that may be produced based on a larger demand of the screw than previous captive screws.

It is a still further object of the present invention to provide a process for manufacturing a captive screw that provides for reduced delivery time.

It is a still further object of the present invention to provide a process for manufacturing a captive screw that creates a captive screw that is lower in cost than present captive screws of similar type, but functions in substantially the same way, or in a manner superior to such previous captive screws.

It is a further object of the present invention to provide a process for manufacturing a captive screw that may be manufactured at, for example, approximately ten times faster than previous captive screws.

It is a still further object of the present invention to provide a process for manufacturing a captive screw that provides for less flaking of metal during assembly of the captive screw itself and during use of the captive screw.

Other objects and advantages of the present invention will become apparent from the following description taken in conjunction with the accompanying drawings.

BRIEF DESCRIPTION OF THE DRAWINGS

FIG. 1 is a side elevation view of the captive screw embodying the present invention, with the knob in the extended position.

FIG. 2 is a cross-sectional view of the captive screw of FIG. 1 taken along line 2—2 of FIG. 1.

FIG. 3 is the cross-sectional view of the captive screw of FIG. 2 with the knob in the depressed position with the screw in a fully extended position.

FIG. 4 is a perspective view of a screw as used in the captive screw of FIG. 1.

FIG. 5 is a cross-sectional view of the captive screw of FIG. 1, taken along line 5—5 of FIG. 2.

FIG. 6a is a top view of the captive screw of FIG. 1 depicting a Phillips screwdriver recess.

FIG. 6b is a top view of the captive screw of FIG. 1 depicting a slotted screwdriver recess.

FIG. 6c is a top view of the captive screw of FIG. 1 depicting a hex driver recess.

FIG. 7a is a top view of an alternate embodiment of the captive screw of FIG. 1 having a smooth knob and a Phillips screwdriver recess.

FIG. 7b is a top view of an alternate embodiment of the captive screw of FIG. 1 having a smooth knob and a slotted screwdriver recess.

FIG. 7c is a top view of an alternate embodiment of the captive screw of FIG. 1 having a smooth knob and a hex driver recess.

RIG. 12 a side elevation view of an alternate embodiment of the captive screw embodying the present invention, with the knob in the extended position.

Figure 13:
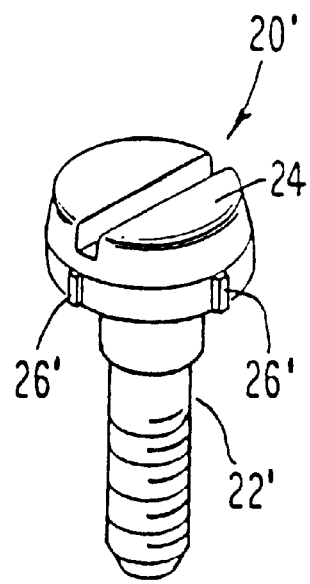
Figure 12:
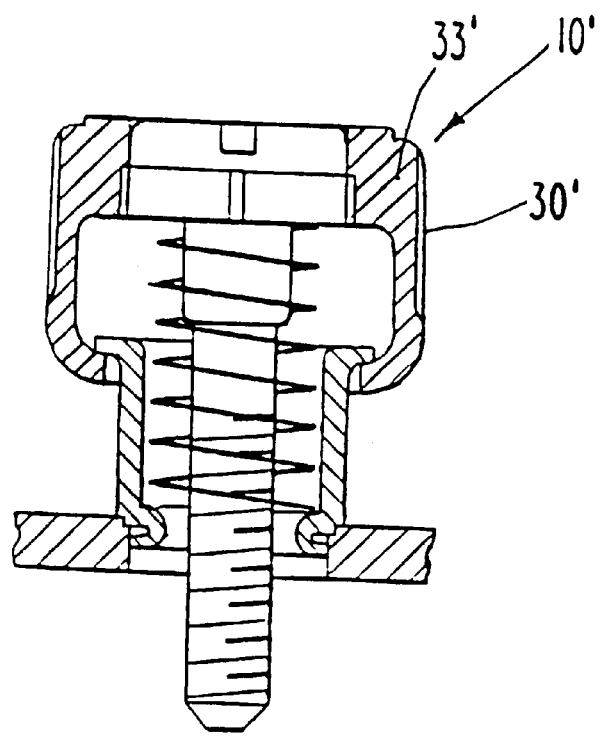

FIG. 13 is a perspective view of an alternate embodiment of a screw as used in the captive screw of FIG. 12.

Figure 14:
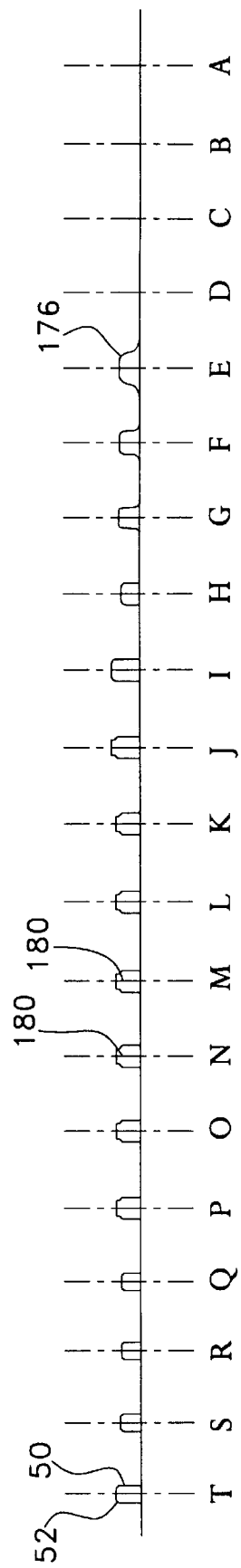

FIG. 14 is a side elevation schematic view of a progressive die for forming a press-in style captive screw.

Figure 15:
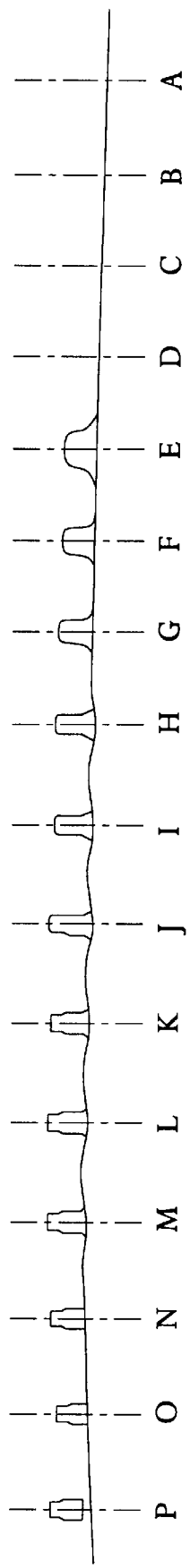

FIG. 15 is a side elevational schematic view of a cold-forming die progression for forming a flare-in style captive screw ferrule.

Figure 16:
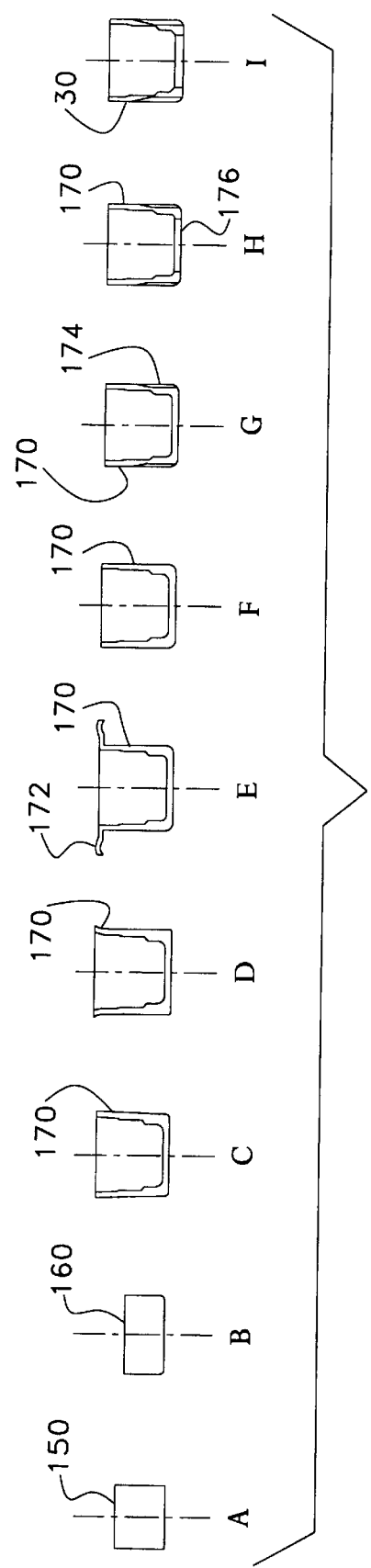

FIG. 16 is a side elevational schematic view of a cold-forming die progression for forming a knob for a captive screw.

Figure 17:
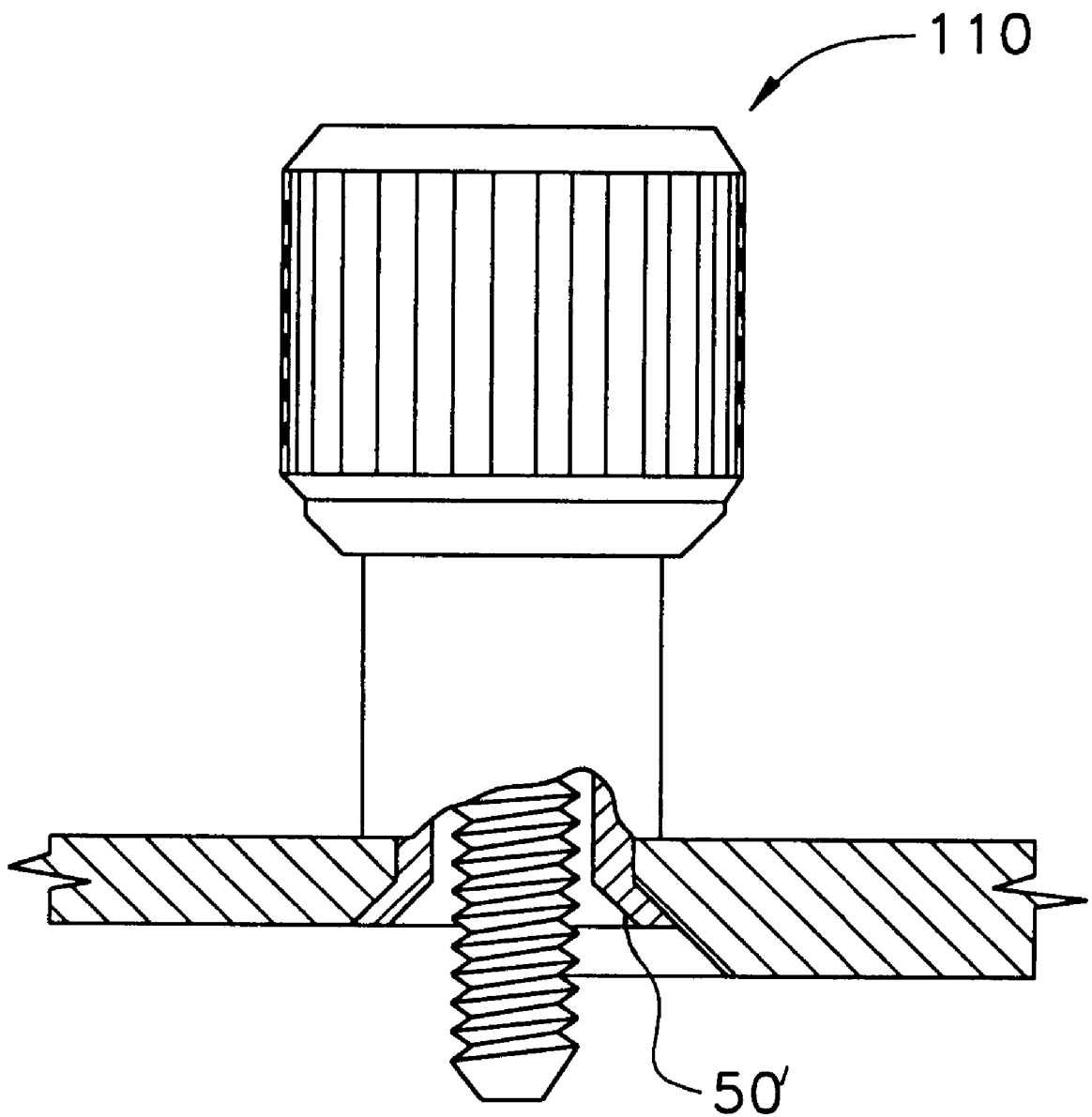

FIG. 17 is a side elevational view, partially broken away, of a flare-in style captive screw.

DESCRIPTION OF THE PREFERRED EMBODIMENT

Cold Forming in General

Aluminum and certain steel alloys in general may readily be adapted to a cold-forming process. In the present invention, the knob and possibly the ferrule are each preferably made from an aluminum alloy. While lower strength and more ductile aluminum, including alloys 1100 and 3003 are typically easiest to extrude, the present application typically requires increased mechanical properties, such that a heat treatable grade is preferably used. Since this type of grade is usually more susceptible to cracking or similar flaws and imperfections, special care is required in selecting the proper base material and type of slug.

Any type of press may be used such as a mechanical or a hydraulic press, so long as it provides sufficient force and sufficient stroke to form the parts. One skilled in the art of cold forming with presses can easily select an appropriate press for this process.

The Captive Screw

Referring now in detail to the drawings wherein like reference numbers indicate like elements throughout the several views, there is shown in FIGS. 1, 2 and 3 a press-in style retractable captive screw 10 made in accordance with one preferred embodiment of the present invention. The illustrative device is shown generally comprising a screw 20 having a threaded shaft 22 and a screw head 24, a generally cylindrical thin-walled hollow knob 30, a spring or other biasing means 40, a generally cylindrical hollow ferrule 50, with a panel attachment means 52, and a screw captivation means 54. The illustrative device is shown in FIGS. 1, 2 and 3 as installed on a first panel 60. FIG. 3 depicts the captive screw as installed on a first panel 60 and screwed into second panel 62.

The generally cylindrical, partially hollow knob 30 has a hollow cylindrical body 32 that preferably has a region of increased thickness 33 near the upper end of the knob 30 and a top annular surface 31 in which the head 24 of screw 20 sits. As seen in FIG. 4, the screw 20 has an annular flange 23 around the lower end of the screw head 24 and a plurality of protrusions 26 integral to an outer perimeter 25 of the annular flange 23 around screw head 24. These protrusions 26 provide a press-fit to the region of increased thickness 33 on the inner surface of the knob 30 whereby material in the knob 30, which is preferably made from a soft material relative to the screw head 24 such as aluminum, is displaced by the protrusions 26 of the screw 20, which is made from a relatively hard material, such as stainless steel. The screw 20 is thereby rigidly secured to the knob 30.

Figure 10:
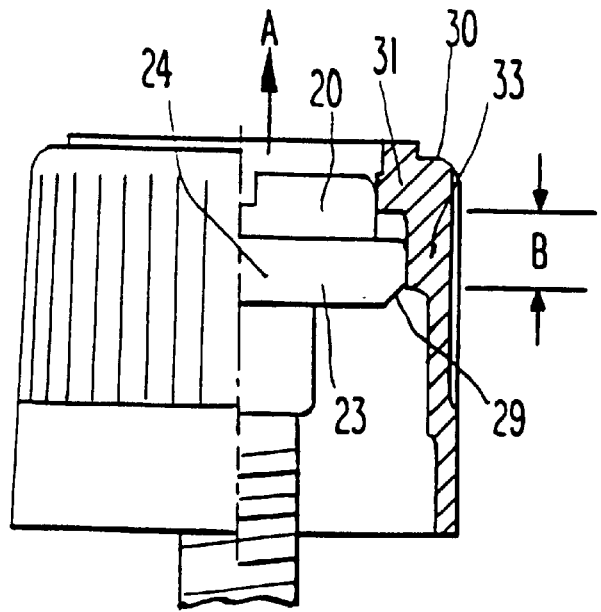
FIG. 10 is a partially cut away side elevation view of a knob/screw assembly as used on the captive screw of FIG. 1, with the optional additional chamfer of the screw as a knob/screw retention means, during the assembly of the knob and the screw.
Figure 11:
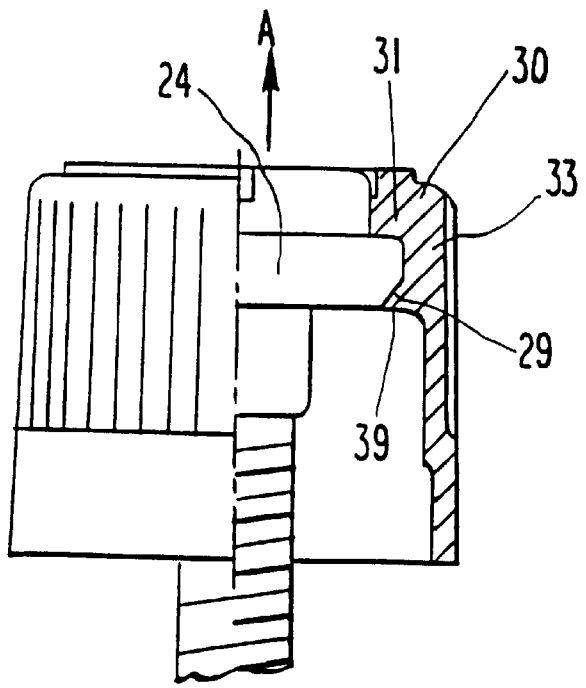
FIG. 11 is a partially cut away side elevation view of the knob/screw assembly of FIG. 10, upon completion of the knob/screw assembly.

Additionally, further structure may optionally be provided to further secure the knob 30 to the screw head 24 as can be seen in FIGS. 10 and 11. At the lower surface of the annular flange 23 of the screw 20 is an optional chamfer 29. A chamfer of 0.025 inches at approximately forty-five degrees has been found to be suitable for most screw sizes. FIG. 10 depicts a knob/screw assembly during the pressing-in of the screw prior to the point where the screw has been fully pressed-in to the knob 30. Note that the protrusions 26 as described above are not shown in FIGS. 10 and 11. The protrusions 26 may or may not be used. As the screw head 24 is pressed further into the inner surface of the knob 30 in direction of arrow A in FIGS. 10 and 11, material from the lower end of the region of increased thickness of the knob 33 flows into the chamfer 29 area such that this annular ring of material 39 holds the screw head 24 to the knob 30. The region of increased thickness 33, i.e. the distance between the top annular surface 31 or cap section of the knob 30 and the bottom of the region of increased thickness 33 of the knob 24 (Distance B in FIG. 10), is slightly longer in its axial dimension than the total thickness of the annular flange 23 around the screw head such that, while the screw head 24 is pressed into the knob 30 in direction A, the knob material flows into the area of the chamfer 29 and then is positively stopped.

Figure 8:
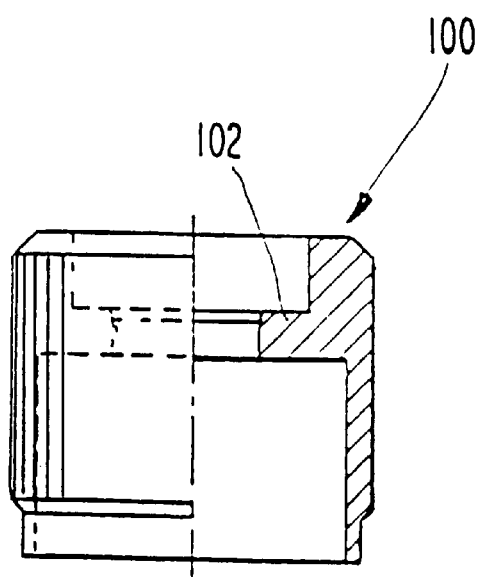
FIG. 8 is a partially cut away side elevation view of a knob as used on a prior art captive screw, prior to assembly with a ferrule, spring and screw.
Figure 9:
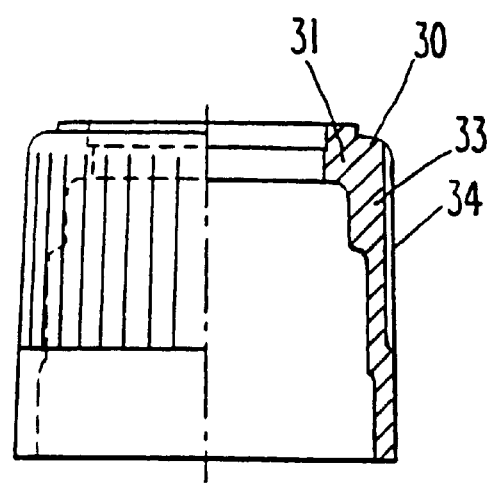
FIG. 9 is a partially cut away side elevation view of a knob as used on the captive screw of FIG. 1, prior to assembly with the ferrule, spring and screw.

This structure of the present captive screw 10 is suited for manufacturing techniques that was not heretofore available for captive screws of this general type. Previous captive screws had more complex knob shapes in the interior of the knob and were made of a harder material. For example, as depicted in FIG. 8 which shows a prior art knob 100 prior to its assembly during manufacturing, annular surface 102 is used which holds a screw in place (not shown). This screw is pressed into place in the knob 100 and is held in place by a splined section below the screw head. This arrangement is shown in more detail in FIG. 1 of U.S. Pat. No. 5,382,124. That annular surface 102 is not required in the present captive screw since the screw 20 is held in place at the perimeter of the screw head 24. As shown in FIG. 9, the knob 30 of the present invention has a more simple internal design which makes the knob 30 amenable to a cold formed manufacturing technique which yields best results with a softer material. The annular surface 102 of the prior art knob 100 is no longer used since the screw 20 of the present invention is held in place by the protrusions 26 on the outer perimeter of the screw head 24 or flange 23 as can be seen in FIGS. 1–5, and/or the chamfer 29 as described above and seen in FIGS. 10 and 11, rather than the splined section on the screw shaft of the prior art. Thus, a softer material, preferably a softer aluminum may be used since in the prior screws (see, e.g., FIG. 1 of U.S. Pat. No. 5,382,124) use of a soft material for the annular flange 102 would lead to breakage during assembly of the screw 20 to the knob 30.

Additionally, significant structural advantages of the present screw exist over prior captive screws having the annular flange within their knobs. In the present captive screw 10, the bottom annular surface of the screw 20 is in direct contact with the ferrule 50 when the screw is in the fully extended position, i.e. when the first panel 60 is screwed down to the second panel 62 as depicted in FIG. 3. The load of the screw 20 runs directly from screw 20 to ferrule 50 to panel 60 rather than from screw to knob to ferrule 50 to panel as in most prior art screws (see, e.g., FIG. 8 and U.S. Pat. No. 5,382,124). This eliminates breakage of the annular flange 102 during both assembly of the screw 20 to the knob 30 and during use of the captive screw 10 of the present invention. Additionally, the flange 23 provides a positive stop during the assembly of the screw 20 to the knob 30. This provides for extremely tight tolerances and reliability with respect to he structural integrity of the captive screw. Additionally, the added surface area where flange 23 bears against ferrule 50 provides increased structural integrity, particularly during the installation of the screw 10 to a panel 60.

The screw 20 also has an optional region of increased shaft thickness 21 in the area of the screw shaft 22 adjacent the screw head 24 or flange 23. This region of increased shaft thickness provides two valuable functions. First, it simplifies manufacturing of the screw since, the step-up in diameter from the screw shaft to the outer perimeter of the screw head 24, particularly if the flange 23 is used, is particularly difficult to manufacture. Second, it provides for increased volume of material where a Phillips style screw driver recess (see FIG. 6a) or a Torx style (not shown) recess is used.

The previous knob/screw interface of the knob was best operable when the interface was machined rather than cold formed. Machining is far more costly when products are made in significant quantities, far more time consuming, and far more expensive than cold forming when making significant quantities, and potentially yields a tremendous quantity of wasted raw material. The present invention, which preferably uses cold forming to manufacture the knob, may use a significantly less costly manufacturing technique for making large quantities of parts.

The remaining structure of the captive screw of the present invention is preferably as follows. Integral to the head 24 of the screw 20 is a driving recess, for example, a recessed slot 27 (see FIGS. 2–4, 6b, and 7b), for use with a slotted-type screwdriver. As shown in FIGS. 6a, 6c, 7a, and 7c, alternate embodiments may include a Phillips-type recess 27' for use with a Phillips-type screwdriver, a socket recess 27" for use with a socket wrench or any other drive recess as is known in the art. Optionally, disposed on the outer circumferential surface 34 of the knob 30 are axial scored lines or knurls 36 to facilitate tightening of the retractable captive screw 10 using only fingers, without tools, or to facilitate the initial alignment of the screw threads 22 with a threaded hole in a second panel 62. Alternate embodiments may include a knurling pattern or other frictional surface (not shown) or a smooth surface knob 30' such as that shown in FIGS. 7a, 7b, and 7c.

As can be seen in FIGS. 2 and 3, the knob 30 is attached to the ferrule 50, however, full rotational movement of the knob 30 with respect to the ferrule 50, and a limited amount of axial movement of the knob 30 with respect to the ferrule 50, corresponding to screw engagement length, are provided. The limited axial movement is accomplished by a first annular flange 35 on the knob 50 extending inward from the inner surface 38 of the hollow knob 30 towards the threaded shaft 22, in combination with a second annular flange 56, integral to the ferrule 50, extending outward from the body of the ferrule 50 at the knob end or first end of the ferrule 50. The inside surface 38 of the hollow knob 30 has a larger diameter than the outside diameter of the ferrule annular flange 56 such that a portion of the ferrule 50 is slidable within the hollow cylindrical body 32 of the knob 30. When the captive screw 10 is engaged, i.e. when two panels are rigidly connected by the captive screw 10, the upper end of the ferrule 50 is inserted into the hollow cylindrical body of the knob 30. The first and second annular flanges 35 and 56 allow the knob 30 and the ferrule 50 to be a single, non-detachable assembly, while allowing for radial and axial movement of the knob 30 with respect to the ferrule 50. During assembly of the captive screw 10, a cylindrical flange on the knob (see FIG. 9) is rolled over as shown in FIGS. 2 and 3 to captivate the knob 30 on the ferrule 50.

Encased between the lower end of the ferrule 50 and the head of the screw 20 is a spring 40. Preferably, at the lower end or second end of the ferrule 50, adjacent the panel attachment means 52 is an annular surface 57 protruding inwardly toward the axial center of the ferrule 50. This annular surface 57 serves to function as a termination point for one end of spring 40. The opposite end of spring 40 is terminated at the underside of screw head 24, as depicted in FIGS. 2 and 3. When the spring 40 is in its most compressed position as shown in FIG. 3, the knob 30 is at its lowest position, i.e. the upper end of the ferrule 50 is in contact with the underside of the screw head 24. Here, the screw 20 is inserted in the lower panel to its limit. When the spring 40 is in its most uncompressed condition as shown in FIG. 2, the screw 30 is at its most extended position, i.e. the first annular flange 35 on the knob 30 and the second annular flange 56 on the ferrule 50 are in contact with each other as described above.

The panel attachment means 52 may be any such means known in the art, e.g. press-in as depicted in the present figures, snap-in as depicted in U.S. Pat. No. 5,382,124, flare-in (see FIG. 17), screwed, or the like, as is known in the art. FIG. 17 depicts a flare-in style captive screw, where the ferrule 50' is flared in to place on a panel to secure the flare-in style captive screw 110 to the panel.

The ferrule is also preferably cold-formed steel, for example, for a press-in style captive screw, or aluminum for, for example, a flare-in style captive screw, using a similar process.

It has been found that the best material to use for the knob 30 for the aluminum cold forming process is 6082 aluminum alloy, which is material suited for cold forming and not well suited for previous machined knobs. The ability to use this softer material leads to several advantages. First, less "flaking" of the material occurs, where particles of the material may "flake" off during or after the captive screw 10 is installed on a panel. Potential problems may occur if, for example, the captive screw is used on a panel where there are electronic components and flakes of metal from the knob. 30 or ferrule 50 contact the electrical components.

Flaking of metal of prior captive screws occurs both during manufacturing and use of the screw in several areas. First, during use of the prior captive screw (see the knob of FIG. 8), flaking occurs at the interface between the screw and the knob/ferrule interface since the aluminum knob has direct rubbing-action contact with the steel ferrule. Second, during assembly of the captive screws, flaking occurs where the knob attaches to the ferrule when the lower section of the knob is crimped over to hold the knob in place due the harder material required for machining. In prior knobs, flaking occurred during manufacture of the knurl on the outer surface of the knob and during the assembly of the screw to the knob.

The new design using the new knob material minimizes these problems. The new knob/screw interface allows the steel screw 20 to directly contact the steel or aluminum ferrule over a wider area due to the increased width of the annular flange 23, thereby eliminating the aluminum/steel interface of prior captive screws which caused flaking. The crimped knob/ferrule interface does not flake substantially due to use of the softer material now available for use. All flaking is significantly reduced due to the new design in combination with the softer material made feasible for use by the new process.

Additionally, if the prior art knob design is used for the knob/screw interface with the softer material feasible for use by the new design, severe deformation problems of the knob, particularly at the flange 102 of the prior knob 100, would likely occur due to the soft material.

An alternate embodiment 10' of the captive screw 20' of the present invention is depicted in FIGS. 12 and 13. Here, there is no annular flange 23 as depicted in the first embodiment, for example, as shown in FIGS. 2 and 4. The again there are a plurality of protrusions 26' that are pressed into place in a region of increased thickness 33' of knob 30'. The advantages described above for the first embodiment with specifically with respect to the additional annular flange 23 are reduced, however, this embodiment can be manufactured less expensively due to the reduced complexity.

For a press-in style captive screw, as depicted in FIGS. 1, 2, and 3, the ferrule also has a unique configuration in that it does not contain a knurled region on the press-in style panel captivation means. It had previously been thought that the knurling was required to counter rotation of the ferrule 30 on the panel 60. To facilitate the cold-forming of the ferrule this knurling has been removed without detrimental effect on the holding power of the panel captivation means. A flat surface does provide sufficient friction to keep the ferrule from rotating.

The Process for Cold Forming a Captive Screw

The cold-forming process for manufacturing a captive crew 10 enables the captive screws 10 to be manufactured extremely quickly and inexpensively once the process is established. For example, on a single press, more than 10,000 cold-formed knobs or over 20,000 ferrules per hour can be made on a single press, making two or more parts at a time. By the prior method of machining knobs, only perhaps 800 parts at a time could be made per hour on a machine.

With respect to the knob in particular, scrap rates of wasted material decline substantially. For a typical machined knob, there was approximately 75% scrap with approximately 25% of material used for the knob. For a typical cold-formed knob, there is approximately only 10% scrap with 90% of material used for the knob. Additionally, due to very tight tolerances in the cold-forming process, the parts made are more uniform than comparable machined parts.

While the cold-forming process for manufacturing many types of screws is known, the cold-forming process for making ferrules and knobs for captive screws is not known to have been attempted or accomplished. The process steps for cold-forming the knob and ferrule are as follows.

Cold Forming a Knob

Aluminum stock for the slugs for cold-forming is typically obtained by blanking from plate, sawing or machining bars, or by casting. Rolled aluminum alloy plate is a typical type of slug stock for cold forming. To obtain optimal performance of the present process, it has been found that it is preferable to utilize punched slugs, rather than extruded wire or slugs machined from bars. The plug is preferably made by a fine blanking type process due to its ability to create slugs having very tight tolerances with no shear or break edges. It is important that the plug be perfectly uniform. For example, casting of the slugs would not likely offer perfect uniformity.

FIG. 16 depicts the steps for cold forming the knob of the captive screw. If the slug 150 (FIG. 16, step A), is not in the desired initial shape, it may first be pressed into the initial configuration to fall within the desired tolerances 160 (FIG. 16, step B). A press operation forming an initial cup-shaped article is made (FIG. 16, step C), with several successive steps used to have all desired dimensions fall within desired tolerances and major details of the knob in place (FIG. 16, steps D, E, F). Base material 172 is then removed where it is situated outside the perimeter of the cup-shaped cylindrical article (FIG. 16, step F). Knurls 174 into the outer surface of the cup-shaped article are provided in the next forming operation, if knurls 174 are desired (FIG. 16, step G). A hole 176 in the bottom of the cup, coaxial with the hollow cylindrical walls of the cup (FIG. 16, step H), is then provided thereby forming the knob 30.

Each knob 30 is preferably made individually, not on a strip as on the ferrules 50 as described below, with each step as a single press operation. A 100 ton press has been found to be more than satisfactory. Several knobs can be made simultaneously on a single press, depending upon the size of the press used.

Cold Forming a Ferrule

It has been found that to obtain optimum production levels, while standard dies may readily be utilized to obtain significant advantages as described above, a progressive die as is known in the art using a series multiple steps as shown in FIG. 14 for forming a carbon or stainless steel press-in style ferrule and FIG. 15 for forming an aluminum flare-in style ferrule yields immense productivity increases over that of prior machined ferrules.

The steps for cold forming the stainless steel ferrule include first providing the base metal material. A flat sheet of carbon steel, for example, 0.026 inches thick. Various grades of stainless steel yield satisfactory results including type 304 and 305. 1005 steel, which is a very low carbon steel, draw quality, aluminum killed, has been found to be the best material for the present process.

In practice, it has been found that a 100 ton press provides more than adequate force to provide more than 20,000 parts per hour. A much smaller press can be used particular if a smaller parts rate is desired or a progressive die is not utilized.

Pilot holes are first pierced (FIG. 14, step A) into the steel sheet to allow for pilot pins (FIG. 14, step B) (pins not shown) to come up through the pilot holes to move the sheet of metal incrementally through the progressive die.

Once the pilot pins are inserted through the steel sheet, a series of approximately 18 press operation steps has been found to yield acceptable results, with each step displacing material incrementally toward the final ferrule 50. In steps C and D of FIG. 14, the material is "lanced" or blanked out part way through the material. The material then drawn into an initial cup shape 176 (FIG. 14, step E), and then, in a series of progressive shapes (FIG. 14, steps F, G, H) with progressively straighter sides closer to the final product. The sides of the cylinder are then "ironed" flat to yield a uniform wall thickness (FIG. 14, step I). The bottom of the ferrule is then necked down in a series of incremental steps (FIG. 14, steps J, K, L) to begin to form the press-in means panel attachment means 52 at the bottom of the ferrule (the ferrule is depicted upside down in FIG. 14). A hole is then pierced through the bottom of the ferrule for screw shaft clearance (FIG. 14, step M). The press-in panel attachment means 52 as is known in the art for enabling the captive screw to be pressed into a panel is then formed in a series of incremental steps (FIG. 14, steps N–S). See FIG. 17. Finally, the ferrule is blanked through the sheet If a flare-in style aluminum ferrule as is well known in the art is desired, any aluminum alloy, including 1000, 2000, 3000, 5000, 6000 series is suitable. A flare-in style ferrule is of a more simple design than a press-in ferrule because the lower end of the ferrule, prior to installation on a panel, is merely a hollow cylindrical shape, as can be seen (upside down) in FIG. 15, step P. However, for the present invention, it has been found that superior results, with respect to die life and quality of results, are obtained using 6061 series aluminum in an O-temper, as rolled. This alloy is highly formable. Afterwards, the part is heat treated.

Upon installation of the captive screw 10 to a panel, the end of the ferrule inserted to an annular surface around the edge of the ferrule and the bottom is flared out to hold the ferrule in place on a panel. See FIG. 17.

FIG. 15 depicts the progression of steps to form the aluminum ferrule. As can be seen, overall, the steps of FIG. 15 are substantially the same as that of cold-forming the steel ferrule, particularly steps A thorough I, but fewer steps are required particularly in the forming of the flare-in part of the aluminum ferrule (FIG. 15, steps J–P).

Cold Forming a Screw

As indicated above, cold-forming of screws in general is not new. However, the particular screw shape desired as depicted in FIGS. 4 and 13 is in fact novel. The preferable raw material is copper plated stainless steel wire, type 430. The copper is 0.0001 thick and is used as a lubricant. At the end of the process, the copper is removed, and the stainless screw is cleaned and passivated.

The basic steps are as follows. The wire is cut off to the proper length. A trapped forward extrusion of the wire is used to begin to form the head to obtain a favorable heading ratio. A series of several steps is then made as is typical for screws with large head to shaft ratios is used, as is known in the art. Excess material is then trimmed off leaving the protrusions 26. The copper is then stripped off, the shank is form rolled to length and pointed, the threads are rolled, and finishing operations as are known are performed.

The benefits of cold-forming all of the major parts of the captive screw provide substantial advantages as noted above, particularly if all major parts of the captive screw are manufactured in this manner. However, any major part manufactured by the cold-forming process alone will still offer substantial cost and speed of manufacturing advantages.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A method of making a knob for a captive screw, said captive screw having a ferrule with a means for attachment of the ferrule to a panel, a screw, the knob integrally attached to said screw, and a knob/ferrule interface to captivate the knob on the ferrule, said method of making the knob comprising:

(a) providing a base metal in the form of a generally solid initial slug;

(b) pressing by cold-forming the base material into a generally cylindrical cup-shaped article using at least one pressing operation, said cup having a generally cylindrical side wall, said side wall having a plurality of wall thicknesses;

(c) removing any base material situated outside the perimeter of the cup-shaped cylindrical article; and (d) providing a hole in the bottom of the cup, coaxial with the hollow cylindrical walls of the cup, thereby forming the knob.

2. The method of claim 1, wherein the base metal is an aluminum alloy.

3. The method of claim 2, wherein the aluminum alloy is selected from the group consisting of 6082 series aluminum alloy.

4. The method of claim 2, wherein the aluminum alloy is in an annealed condition of approximately 35 Brinell hardness.

5. The method of claim 1, including the step of providing knurling around a portion of the outer surface of the knob.

6. A method of making a knob for a captive screw, said captive screw having a ferrule with a means for attachment of the ferrule to a panel, a screw, the knob integrally attached to said screw, and a knob/ferrule interface to captivate the knob on the ferrule, said method of making the knob comprising:

(a) pressing a generally solid, generally cylindrical slug, by cold-forming, into a cylindrical cup-shaped article using at least one pressing operation, said cup having a cylindrical side wall having an outer surface and a plurality of wall thicknesses, and with a top rim and a solid bottom, excess material from said pressing forming an annular ring around the top rim of the cup;

(b) cold-forming by pressing an annular groove around the bottom of the cup where the solid bottom of the cup meets the cylindrical side walls of the cup;

(c) trimming the excess material that forms the annular ring around the top of the cup, such that the side walls of the cup are flush with the rim of the cup; and (d) punching a hole in the bottom of the cup, coaxial with the hollow cylindrical walls of the cup, thereby forming a knob.

7. The method of claim 6, wherein the step of pressing a generally cylindrical slug includes providing an aluminum alloy base material, wherein the aluminum alloy base material is 6082 series aluminum alloy.

8. The method of claim 7, wherein the step of pressing the slug includes providing the aluminum in an annealed condition of approximately 35 Brinell hardness.

9. The method of claim 6, including providing knurling around a portion of the outer surface of the knob.

10. A method of making a ferrule for a captive screw, said captive screw having a knob, a screw, the ferrule, and a knob/ferrule interface to captivate the knob on the ferrule, said knob integrally attached to said screw, said ferrule having means for attachment of the ferrule to a panel, said method of making the ferrule comprising:

(a) providing a metal base material in the form of a generally solid initial slug;

(b) pressing the base material, by cold-forming, into a cylindrical article using at least one pressing operation, said cylindrical article having a cylindrical side wall having a plurality of wall thicknesses and having an outer surface;

(c) cold-forming a panel attachment means on an end of the ferrule; and (d) removing any base material situated outside the perimeter of the cylindrical article, thereby forming the ferrule.

11. A method of making a knob and ferrule for a captive screw, said knob integrally attached to said screw, said ferrule having means for attachment of the ferrule to a panel, (a) said method of making the knob comprising:
 (i) providing an aluminum alloy base metal for the knob in the form of a generally solid initial slug;
 (ii) pressing by cold-forming the base material into a generally cylindrical cup-shaped article using at least one pressing operation, said cup having a generally cylindrical side wall having a plurality of wall thicknesses;
 (iii) removing any base material situated outside the perimeter of the cup-shaped cylindrical article; and
 (iv) providing a hole in the bottom of the cup, coaxial with the hollow cylindrical walls of the cup, thereby forming the knob; and (b) said method of making the ferrule comprising:
 (i) providing a metal base material for the ferrule;
 (ii) pressing the base material, by cold-forming, into a cylindrical article using at least one pressing operation, said cylindrical article having a cylindrical side wall having an outer surface;
 (iii) cold-forming a panel attachment means on an end of the ferrule; and
 (iv) removing any base material situated outside the perimeter of the cylindrical article, thereby forming the ferrule.

12. A method of making a ferrule for a captive screw, said captive screw having a screw, the ferrule, and an interface to captivate the screw to the ferrule, said ferrule having means for attachment of the ferrule to a panel, said method of making the ferrule comprising:

(a) providing a metal base material in the form of a generally solid initial slug;

(b) pressing the base material, by cold-forming, into a cylindrical article using at least one pressing operation, said cylindrical article having a cylindrical side wall having an outer surface and a plurality of wall thicknesses;

(c) cold-forming a panel attachment means on an end of the ferrule; and (d) removing any base material situated outside the perimeter of the cylindrical article, thereby forming the ferrule for the captive screw.

* * * * *